Figure 1:
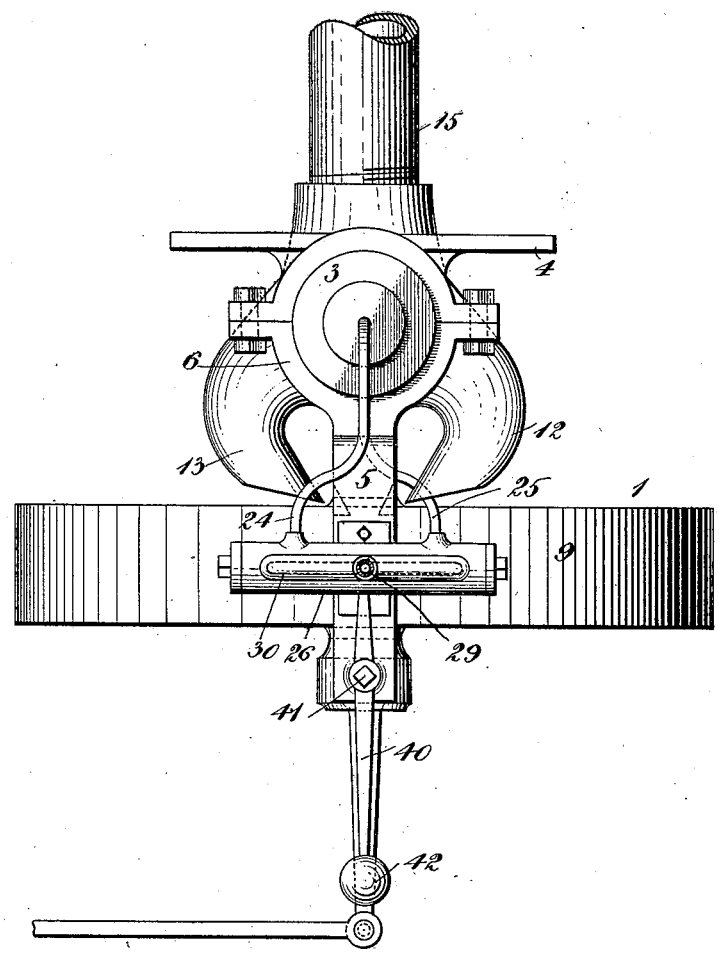

J. S. LANG.
GYROSCOPIC CONTROL.
APPLICATION FILED APR. 26, 1912.

1,096,254.

Patented May 12, 1914.
3 SHEETS—SHEET 1.

J. S. LANG.
GYROSCOPIC CONTROL.
APPLICATION FILED APR. 26, 1912.
1,096,254.
Patented May 12, 1914.
3 SHEETS—SHEET 3.
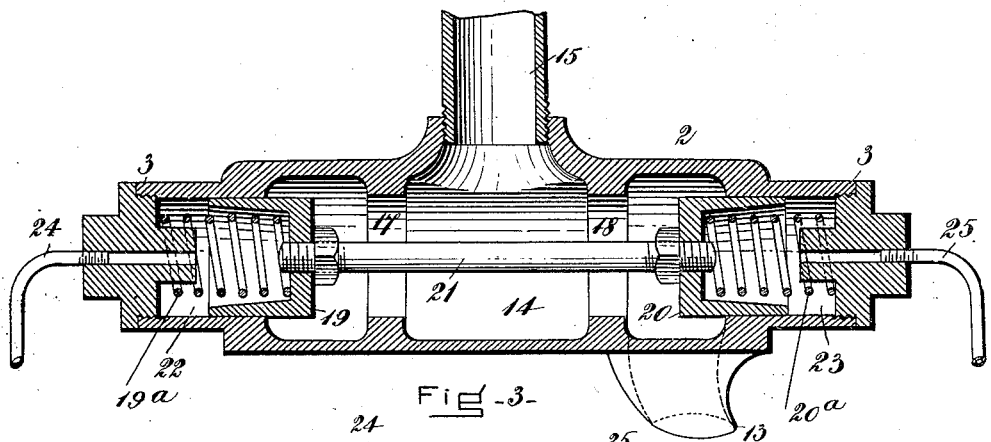
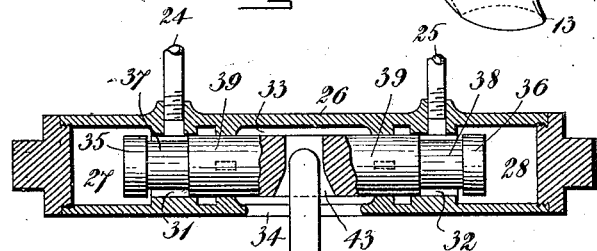
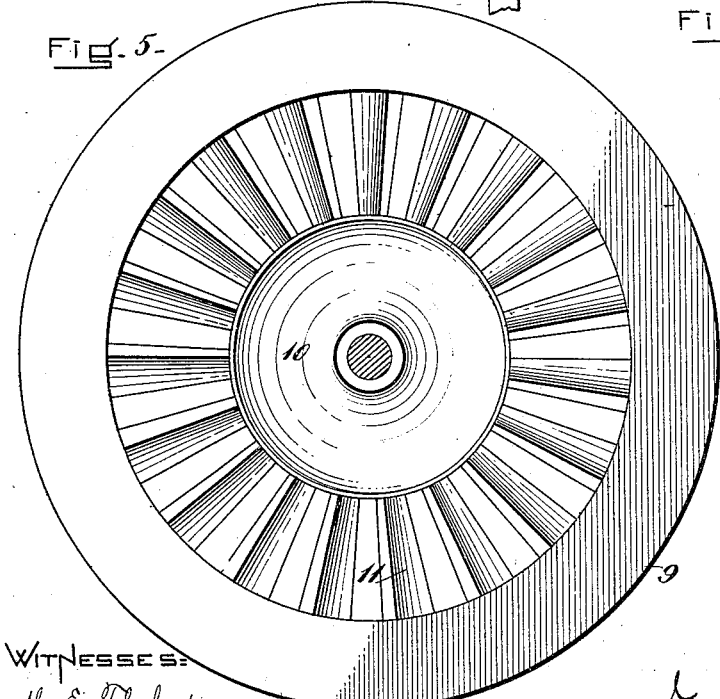
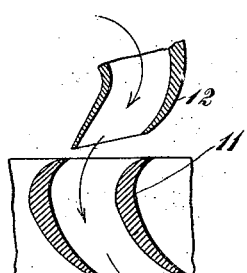
WITNESSES:
M. E. Flaherty
A. E. O'Brien
INVENTOR:
James S. Lang
by his attys
Coale & Hayes

UNITED STATES PATENT OFFICE.

JAMES S. LANG, OF BOSTON, MASSACHUSETTS.

GYROSCOPIC CONTROL.

1,096,254.   Specification of Letters Patent.   Patented May 12, 1914.

Application filed April 26, 1912. Serial No. 693,279.

*To all whom it may concern:*

Be it known that I, JAMES S. LANG, of Boston, in the county of Suffolk and State of Massachusetts, a citizen of the United States, have invented a new and useful Improvement in Gyroscopic Controls, of which the following is a full, clear, and exact description, reference being had to the accompanying drawings, forming a part of this specification, in explaining its nature.

My present invention comprises for its subject-matter a gyroscopic apparatus essentially adapted for effecting the automatic control of flying machines or other unstable machines and by which means such machines may be maintained in or restored to a condition or state of normal and proper equilibrium or balance.

A gyroscope like that to which my invention relates is one carried by a supporting frame and pivotally supported to hang in a normal position of suspension, and when employed for effecting the automatic control of a flying machine, is pivotally hung from the main axis of the machine or from an axis parallel to the main axis. The gyroscope thus pivotally hung tends to maintain a constant position as other parts of the machine turn about said axis. Upon the machine becoming unbalanced the gyroscope or frame carrying the same, maintaining its position, becomes a base of resistance against which forces may act or react tending to correct the displaced position of the machine and restore it to its normal and proper position.

The gyroscope tends to maintain a normal and constant position of suspension by reason of its rotation, as is customary in such devices. It may, however, become itself displaced from such position when it will no longer properly perform the functions for which it is designed and it becomes necessary that it be restored to its normal position of suspension, or, in other words, maintained in such position.

The essential object of my invention is to provide an apparatus by which the gyroscope designed for the purposes above described, may be driven by the impelling force of jets of gaseous fluid, as for example, the exhaust gases from an internal combustion engine, and to apply these gases to the gyroscope in such manner that the gases will not only operate to rotate the gyroscope without displacing it from its normal position of suspension, but will also operate, in case of displacement of the gyroscope and by the manner of its application to restore it to its normal and proper suspended position, thereby tending to maintain the gyroscope in such position at all times.

The invention can best be seen and understood by reference to the drawings, in which—

Figure 2:
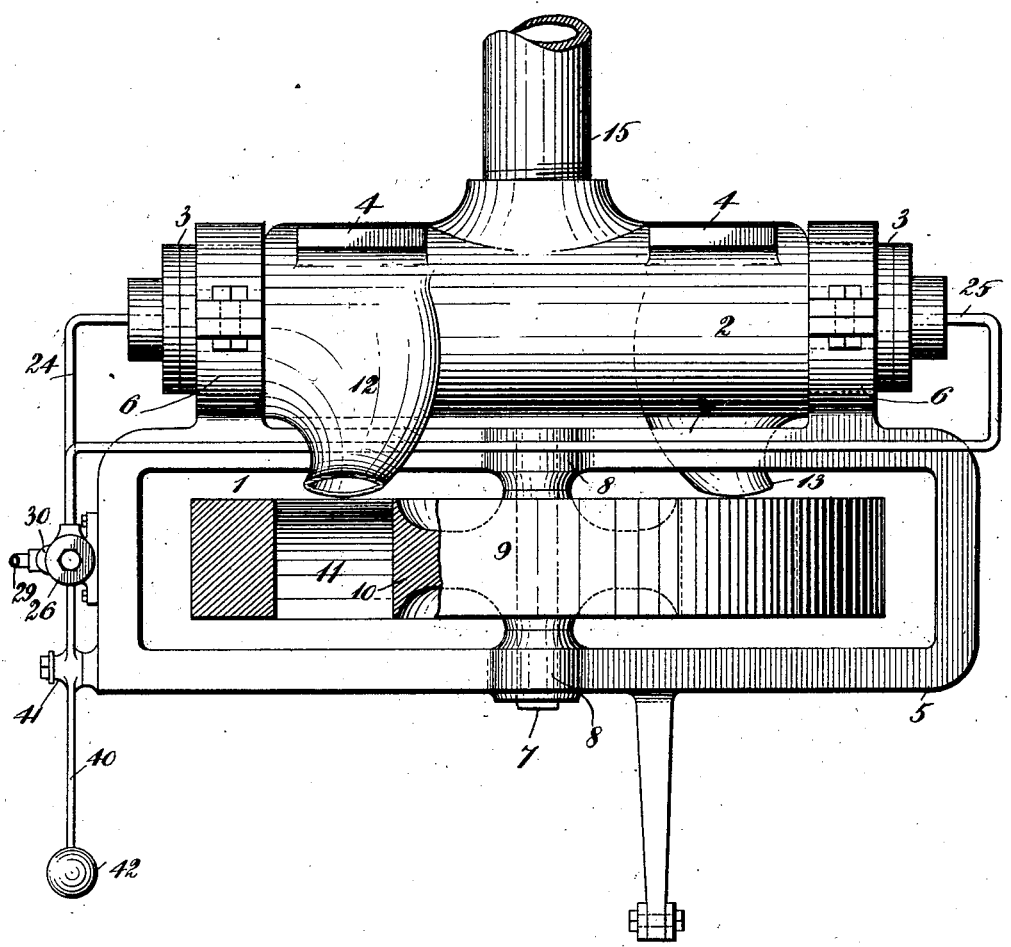

Figure 1 shows the apparatus in end elevation. Fig. 2 shows the same in side elevation. Fig. 3 is a vertical longitudinal section of a portion of the apparatus or main valve casing and valve contained therein through which the operating fluid is directed to the gyroscope. Fig. 4 is a view partly in side elevation and partly in longitudinal vertical section of the valvular apparatus or pilot valve by which the supply of gaseous fluid is initially controlled through the influence of a pendulum, as will hereinafter be explained. Fig. 5 is a plan of the gyroscope, looking at the same from the top side thereof, and Fig. 6 is a diagrammatic section of parts, showing the manner in which the gaseous fluid is applied to the gyroscope for turning it.

In the drawings:—1 represents the gyroscope.

2 is a casing to which the gaseous fluid under pressure is admitted and thence expelled for rotating the gyroscope and controlling the suspended position thereof as will hereinafter be explained, the casing furnishing also a support from which the gyroscope is hung, the ends of the casing being formed to provide trunnions 3, 3. The casing is fixed to a frame 4 which may represent for purposes of illustration a portion of the frame of a flying machine (not shown), the casing being horizontally arranged to lie within the main axis of said frame of the flying machine or axis parallel therewith when the frame is in its normal and proper balanced position.

The gyroscope is carried by a frame 5 which hangs from the trunnions 3, 3 of the casing 2 by straps 6, 6 which pass around its respective trunnions and provide bearings by which the frame 5 may turn pivotally thereon. The gyroscope is arranged upon a spindle 7 which turns within bearings 8, 8 on the frame 5. When the frame 5 is occupying a normal suspended position the spindle 7 will have a vertical extension and the gyroscope accordingly turn on a vertical axis in a horizontal plane.

In construction the gyroscope comprises an outer rim portion 9, a hub 10 fixed to the spindle, and buckets 11 annularly arranged between the rim and hub and against which the gaseous fluid is directed to impinge for rotating the gyroscope. The gaseous fluid is directed against the buckets of the gyroscope by nozzles 12 and 13, respectively. These nozzles project from the casing 2 and are arranged above the gyroscope on opposite sides thereof and on opposite sides also of the frame 5 carrying it just adjacent the line of the buckets, but their disposition is such that they will not interfere with the frame 5 so as to prevent the casing 2 to which the nozzles are secured and frame 4 to which the casing is secured turning with respect to the frame 5 and gyroscope carried by it when occupying a normal suspended position. The form and arrangement of the nozzles is also such that the gaseous fluid issuing therefrom, respectively, will issue in reverse directions or in the directions the gyroscope is turning, at the respective points, on opposite sides thereof, where the jets of fluid impinge against its buckets. The points where the jets impinge against the buckets should also be either in or very near the points where a plane passing through the axis of the frame 5 carrying the gyroscope and also through the axis on which the gyroscope is turning, would cut the same. In other words, the disposition and arrangement of the nozzles with respect to the gyroscope or pivoted frame 5 carrying it and their axis of suspension are such that a jet from either nozzle will operate both to rotate the gyroscope and also pivotally move it and the frame 5 in the direction in which the jet is moving around their axis of suspension. Inasmuch as the jets are moving in reverse directions and the gyroscope and frame will accordingly be pivotally moved thereby in reverse directions with respect to their axis of suspension depending as the jet is issuing from one or the other of the nozzles and operating to turn the gyroscope. When, however, jets from both nozzles are operating to turn the gyroscope, then the force of the two jets issuing therefrom being equal in amount but opposite in direction, will accordingly neutralize one another in their tendency to pivotally turn the gyroscope and frame 5 around the axis of their suspension, and the gyroscope and frame will therefore maintain a normal position of suspension although the jets from the respective nozzles are operating to rotate the gyroscope. This condition of equality continues as long as the jets from both nozzles are operating to turn the gyroscope. When, however, the force of the jet from one nozzle or the other is diminished or cut off then the jet from the other nozzle continuing and no longer being neutralized, will as above described tend to turn the gyroscope and frame carrying it about the axis of its suspension in the direction in which the jet or the stronger jet is moving.

With the parts above described thus disposed and operating, it is apparent that the gyroscope may be rotated while occupying a normal position of suspension, and in case of displacement from such position by it and its frame 5 turning around their axis of suspension, the gyroscope may be returned to its normal position by shutting off or lessening the strength of one of the jets tending to turn the same, when the other jet will operate to restore the gyroscope to its normal position. Reference will accordingly now be made to the manner in which this may be automatically accomplished.

The casing 2 is formed to provide a central chamber 14 into which the operating fluid is introduced through the inlet pipe 15. The nozzles 12, 13 connect, respectively, with this chamber through ports 17, 18 at opposite ends of the chamber. These ports are controlled by valves 19, 20, respectively, and connected by a rod 21 by which the valves are moved in unison. Each of the valves 19, 20 are made cup-shaped and are arranged respectively to slide in the respective ends of the casing 2 the interior walls of which form bearings therefor. The form and arrangement of the valves and casing are also such that the valves and casing at the ends thereof provide compression chambers 22, 23, respectively, to which air under pressure is admitted back of the respective valves. Air thus admitted will act to hold the valves in a balanced position or move the same in one direction or the other for closing one or the other of the ports 17, 18, depending as the air is eliminated from one of the compression chambers and continued to be admitted to the other. The normal balanced position of these main valves is substantially as shown in Fig. 3 when both valves are removed from the respective ports 17, 18 and the operating pressure may pass from the central chamber 14 through the ports to the respective nozzles. The valves are held in this position by means of springs 19ª, 20ª, respectively, contained in the chambers 22, 23, and interposed between the respective valves and the ends of the casing 2.

Air under pressure is admitted to the chambers 22, 23, by pipes 24, 25. These pipes connect with a casing 26 arranged upon the side of the frame 5 carrying the gyroscope. This casing contains a sliding pilot valve which acts to control the entry of compressed air to the pipes 24, 25, and chambers 22, 23, for controlling the main valves. The casing 26 is an elongated casing, the ends thereof being designed to provide air-receiving chambers 27, 28, respectively. Air under compression from any suitable source of supply is admitted to these respective chambers by way of an inlet 29 and suitable by-pass 30 (see Fig. 1) connecting therewith. Extending inwardly from the chambers 27, 28, of the valve casing it is formed to provide the respective ports 31 and 32 which connect with an enlarged central chamber 33 which is open to the atmosphere by a slot or opening 34 formed in the bottom of the casing.

The pilot valve itself consists of the respective head or end portions 35, 36, the contracted neck portions 37, 38 and a central body portion 39. The head or end portions and the body portion of the valve are of substantially the same size and have a sliding fit within the contracted portion of the casing forming the respective ports 31, 32 therein. The length of the valve is such that when it is in a balanced central position as shown in Fig. 4 both the heads 35, 36 of the valve will lie within the respective chambers 27, 28 of the casing just beyond the ports 31, 32. The body 39 of the valve will then be in a position where the ends thereof will fit in both ports 31, 32 and close the inner ends of these ports and chambers 27, 28 from the central chamber 33 open to the atmosphere as aforesaid. When the valve is in this position the operating pressure admitted through the inlet 29 and by-pass 30 to the respective chambers 27, 28 of the casing will pass around the respective heads or ends of the pilot valve into the respective ports 31, 32 by the contracted portions 37, 38 of the valve and thence to the respective pipes 24, 25 which connect with the casing at the points of its ports. When, however, the relative positions of the pilot valve and casing become changed, as for example by moving the valve within the casing, then and in such event the supply of pressure to the one or the other of the pipes 24, 25 will be cut off depending upon the direction the pilot valve is moved, for as the valve is moved within the casing one head or the other of the valve will draw into the one or the other ports 31, 32 and so will shut off the air entering that port. Moreover, as one head of the valve draws into the port adjacent to it closing the port, the adjacent central body portion 33 of the valve entering that port, will draw out of the same allowing the compressed air in the pipe connecting therewith and compression chamber with which the pipe connects to have outlet to the atmosphere by way of the central chamber and opening 34.

The relative position of the pilot valve within its casing is controlled by a lever or pendulum 40. It will be observed by reference to Fig. 1 that the valve casing 26 containing the pilot valve is arranged crosswise upon the side of the pivoted frame 5 carrying the gyroscope. The disposition and arrangement of this casing and valve within it is such also that when the pivoted frame is in its normal and proper position of suspension both the casing and pilot valve will occupy a horizontal position at right angles to the side of the frame 5 to which the parts are secured.

The weighted lever 40 is pivoted to the side of the frame at a point 41 below the casing and pilot valve. The lever is maintained in a normal upright vertical position by a weight 42 upon the end of the lower arm thereof. The upper or working arm of the lever passes upwardly through the openings 34 formed in the bottom of the casing 26 and enters a socket 43 formed in the body of the pilot valve, the end of the lever arm fitting loosely within this socket.

The disposition and arrangement of the parts are such that as long as the frame 5 to which the weighted lever is pivoted, maintains its normal and proper position the lever will operate to maintain the pilot valve in a central balanced position within its casing so that air admitted to pass through the casing will be directed to enter both pipes 24, 25 and thereby be admitted to both compression chambers 22, 23 and accordingly against both of the main valves 19, 20 and will operate to hold both of these valves in a balanced central position clear of the ports 17, 18, so that the operating fluid admitted to the chamber 14 of the main casing 2 will pass through these ports and thence through both nozzles 12, 13 to operate the gyroscope without disturbing the normal suspended position thereof and its carrying frame 5 with respect to their axis of suspension as above described.

Upon the pivoted frame 5 and gyroscopes carried by it becoming changed from their normal and proper positions of suspension to occupy inclined positions by the frame 5 turning pivotally upon the trunnions 3 forming its axis of suspension, the pilot valve and overweighted lever 40 will turn with it, but the lever will continue to maintain a vertical position and accordingly will act to move the pilot valve within the valve casing in one direction or the other dependent upon the direction in which the pivoted frame 5 is turned and accordingly the direction in which the gyroscope is displaced. The resultant effect is therefore obtained that as the pilot valve is moved in its casing, air will be shut off from one or the other of the pipes 24, 25 and the pressure removed from one of the compression chambers 22, 23 and main valves 19, 20. Pressure will continue to be admitted to the other compression chamber and main valve and will accordingly have the effect of moving the main valves 19, 20 within the casing 2, that valve against which the pressure continues to be applied being moved to close the port controlled by it and to shut off the operating pressure from one of the nozzles 12, 13. At the same time the other main valve will be moved to a more open position and the pressure will continue to pass through the other nozzle. In this connection it will be observed by reference to Fig. 1 together with Figs. 3 and 4, that the adaptation and arrangement of the parts are such that if the frame 5 and gyroscope have become displaced from their normal positions to the right or in the direction of the nozzle 12, according to Fig. 1, then the lever or pendulum 40 retaining its normal vertical position, will become displaced to the left, moving the pilot valve to the right. This movement of the pilot valve will cut off the air or pressure from the pipe 24 and chamber 22 of the main casing, the air therein becoming released to the atmosphere. The air pressure being still applied to the compression chamber 23, will then move the main valves in the direction of the chamber 22, cutting off the pressure from the nozzle 13, but allowing it to continue through the nozzle 12 when it will act as above described to pivotally turn the gyroscope and frame carrying it in a direction reverse to that of their displacement and return the same to their normal and original position. When the frame 5 and gyroscope have reached their normal positions of suspension the lever 40 will then again assume a position in parallel alinement with the frame 5 and will have returned the pilot valve to a central position where it allows the passage of air through both pipes 24, 25, and accordingly to both compression chambers 22, 23. The main valves 19, 20 will then be in the position to which they have become displaced with the valve 20 shutting off pressure from the nozzle 13. The air compressed in chambers 22, 23 being equal and opposite in direction, will tend to exert no force upon the valves to restore them to their original positions where the operating pressure is admitted to both nozzles. This is effected, however, by the operation of the springs $19^a$, $20^a$ which become operative to restore the main valves to their original balanced positions and to hold them in such positions when the operating pressure admitted to both nozzles will tend no longer to pivotally turn the frame 5 and gyroscope, but rather hold the same in their normal position of suspension to which they have become restored.

In case the frame 5 and gyroscope carried by it have become displaced from their normal positions of suspension in the direction of the nozzle 13, according to Fig. 1, then the operation of the parts will be just the reverse of that above described. The pilot valve will be moved to the left, air will be cut off from the compression chamber 23 and the main valves moved in the direction of this chamber cutting off the operating pressure from the nozzle 12. The pressure continuing through the nozzle 13 will then operate to restore the frame 5 and gyroscope to the normal position of suspension, after which the springs will act to restore the main valves to their original balanced positions.

It will be understood that it is desirable to use air for actuating the valves at a higher pressure than the air or gases employed for driving the gyroscope.

Having thus fully described my invention, I claim and desire to secure by Letters Patent of the United States:—

1. In a gyroscopic apparatus, a gyroscope adapted to be driven by the application of a gaseous fluid pressure thereto, a pivoted support bearing said gyroscope, means whereby gaseous fluid under pressure may be applied thereto, and means for controlling the application of such pressure to the gyroscope for rotating it whereby it may exert no influence to pivotally disturb the suspended position thereof, or at other times may exert an influence to disturb and pivotally move the same, dependent upon the position of its suspension.

2. In a gyroscopic apparatus, a gyroscope adapted to be rotated by the application of a gaseous fluid pressure thereto, a pivoted support bearing said gyroscope, means whereby a gaseous fluid pressure may be applied thereto for rotating the same, and means for controlling the application of such pressure to the gyroscope for rotating it whereby it may exert no influence to pivotally move the same when the gyroscope is occupying a normal position of suspension and may exert an influence to pivotally move the same in a direction reverse to the direction of its displacement when said gyroscope is occupying a displaced position relatively to its normal position of suspension.

3. In a gyroscopic apparatus, a gyroscope adapted to be rotated by the application thereto of a gaseous fluid under pressure, a pivoted support bearing said gyroscope, means whereby a gaseous fluid under pressure may be directed against said gyroscope for rotating the same, and means for controlling the application of such pressure to the gyroscope for rotating it whereby it may be in balanced relationship to said gyroscope when said gyroscope is occupying its normal suspended position and in unbalanced relationship thereto when said gyroscope has become displaced from its normal position for returning it to said position.

4. In a gyroscopic apparatus, a gyroscope adapted to be rotated by the application thereto of a gaseous fluid under pressure, a pivoted support bearing said gyroscope, means whereby a gaseous fluid under pressure may be applied to said gyroscope in separate jets on opposite sides thereof for rotating the same, said jets being opposite in direction and in balanced relationship to one another and said gyroscope and exerting no turning movement thereon when said gyroscope is occupying a normal position of suspension, and means for controlling said jets whereby one or the other thereof may become throttled upon said gyroscope occupying a position of suspension displaced from its normal position and the jet remaining operate to both rotate said gyroscope and exert a turning movement thereon for returning it to its normal position of suspension when both jets may again become operative.

5. In a gyroscopic apparatus, a gyroscope adapted to be rotated by the application thereto of a gaseous fluid under pressure, a pivoted support bearing said gyroscope, means whereby a gaseous fluid under pressure may be applied to said gyroscope in separate jets for rotating the same and said jets be applied to the gyroscope on opposite sides thereof to issue in opposite directions and transverse a plane coincident with the axis of suspension of said gyroscope and also its axis of rotation, and means for controlling said jets to exert a balanced turning movement upon said gyroscope or an unbalanced turning movement thereon dependent upon the position of its suspension.

6. In a gyroscopic apparatus, a gyroscope, a pivoted support therefor, nozzles arranged adjacent said gyroscope and disposed on opposite sides thereof and on opposite sides also of a plane passing through the axis of suspension of said gyroscope and also its axis of rotation, said nozzles being also arranged to direct the gaseous fluid issuing therefrom against said gyroscope in opposite directions and transverse said plane, a casing through which said gaseous fluid is directed to pass to said nozzles, a valvular mechanism inside said casing for controlling the flow of fluid to said nozzles, and means carried by said pivoted support and controlled by the position thereof for controlling said valvular mechanism.

7. In a gyroscopic apparatus, a gyroscope, a pivoted support therefor, nozzles arranged adjacent said gyroscope and disposed on opposite sides thereof and on opposite sides also of a plane passing through the axis of suspension of said gyroscope and also its axis of rotation, said nozzles being also arranged to direct the gaseous fluid issuing therefrom against said gyroscope in opposite directions and transverse said plane, a casing through which said gaseous fluid is directed to pass to said nozzles, a valvular mechanism inside said casing for controlling the flow of fluid to said nozzles, and means for controlling said valvular mechanism, the same comprising in part a device carried by said pivoted support and adapted to maintain a constant position of suspension irrespective of the pivotally turned position of said support.

JAMES S. LANG.

Witnesses:
JOHN E. R. HAYES,
M. E. FLAHERTY.

---

Copies of this patent may be obtained for five cents each, by addressing the "Commissioner of Patents, Washington, D. C."